(12) United States Patent
Klose et al.

(10) Patent No.: US 10,460,730 B2
(45) Date of Patent: Oct. 29, 2019

(54) ANNOUNCEMENT SIGNALING ON BOARD AN AIRCRAFT

(71) Applicant: Airbus Operations GmbH, Hamburg (DE)

(72) Inventors: Peter Klose, Hamburg (DE); Michael Luedtke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/184,337

(22) Filed: Jun. 16, 2016

(65) Prior Publication Data

US 2016/0372114 A1 Dec. 22, 2016

(30) Foreign Application Priority Data

Jun. 18, 2015 (EP) .................................. 15172680

(51) Int. Cl.

| | |
|---|---|
| *G10L 15/26* | (2006.01) |
| *H04W 4/20* | (2018.01) |
| *H04L 29/12* | (2006.01) |
| *H04H 20/53* | (2008.01) |
| *H04W 4/48* | (2018.01) |
| *G06F 17/27* | (2006.01) |
| *H04M 15/00* | (2006.01) |
| *H04W 4/14* | (2009.01) |
| *H04W 68/00* | (2009.01) |

(52) U.S. Cl.
CPC ............ *G10L 15/26* (2013.01); *G06F 17/275* (2013.01); *H04H 20/53* (2013.01); *H04L 61/605* (2013.01); *H04M 15/751* (2013.01); *H04W 4/14* (2013.01); *H04W 4/48* (2018.02); *H04W 68/005* (2013.01); *H04M 2242/12* (2013.01)

(58) Field of Classification Search
CPC ................................. G10L 15/26; H04W 4/04
See application file for complete search history.

(56) References Cited

U.S. PATENT DOCUMENTS

| | | | | |
|---|---|---|---|---|
| 6,434,518 | B1 * | 8/2002 | Glenn | G06F 17/289 |
| | | | | 434/156 |
| 6,813,777 | B1 * | 11/2004 | Weinberger | H04B 7/18508 |
| | | | | 348/E5.008 |
| 6,820,055 | B2 * | 11/2004 | Saindon | G10L 15/26 |
| | | | | 704/235 |

(Continued)

FOREIGN PATENT DOCUMENTS

EP 2196775 6/2010

OTHER PUBLICATIONS

European Search Report, dated Dec. 18, 2015, priority document.

*Primary Examiner* — Bobbak Safaipour
(74) *Attorney, Agent, or Firm* — Greer, Burns & Crain, Ltd.

(57) ABSTRACT

A method of signaling speech signal related text messages on board an aircraft, a computer program product for carrying out such a method, an apparatus for signaling speech signal related text messages on board an aircraft, and an aircraft comprising such an apparatus. A method embodiment comprises: providing a speech signal related to an announcement to passengers of an aircraft; obtaining a text message containing text corresponding to spoken words of the speech signal; and signaling the text message to one or more devices on board the aircraft.

12 Claims, 2 Drawing Sheets

(56) References Cited

U.S. PATENT DOCUMENTS

| | | | | |
|---|---|---|---|---|
| 7,630,710 B2* | 12/2009 | Kauffman | H04B 7/18506 455/431 |
| 7,945,934 B2* | 5/2011 | Margis | H04N 7/163 725/74 |
| 8,077,877 B1* | 12/2011 | Martin | G06Q 30/02 379/37 |
| 8,265,938 B1* | 9/2012 | Verna | H04W 4/90 704/274 |
| 9,015,032 B2* | 4/2015 | Daye | G06F 9/454 704/8 |
| 9,037,169 B2* | 5/2015 | Cabos | H04B 7/18502 455/466 |
| 9,128,926 B2* | 9/2015 | Waibel | G06F 17/28 |
| 9,332,401 B2* | 5/2016 | Jones | H04W 4/06 |
| 9,406,236 B1* | 8/2016 | Saccone | G08G 5/0013 |
| 9,473,260 B2* | 10/2016 | Hommel | H04H 20/59 |
| 9,813,144 B2* | 11/2017 | Lauer | H04B 7/18506 |
| 9,873,509 B2* | 1/2018 | Gagnon | A62B 3/00 |
| 2003/0051075 A1* | 3/2003 | Purpura | H04L 41/00 710/1 |
| 2004/0033478 A1* | 2/2004 | Knowles | G07C 13/00 434/350 |
| 2005/0286452 A1* | 12/2005 | Hardgrave | H04W 84/005 370/310 |
| 2006/0095249 A1 | 5/2006 | Kong et al. | |
| 2006/0107295 A1* | 5/2006 | Margis | H04N 7/163 725/81 |
| 2006/0270354 A1* | 11/2006 | de La Chapelle | H01Q 1/28 455/66.1 |
| 2008/0085691 A1* | 4/2008 | Harvey | H04B 7/18508 455/187.1 |
| 2008/0104642 A1* | 5/2008 | Galipeau | H04N 7/10 725/76 |
| 2009/0274097 A1* | 11/2009 | Budinger | H04B 7/18506 370/328 |
| 2010/0030557 A1* | 2/2010 | Molloy | G10L 13/00 704/235 |
| 2010/0152924 A1 | 6/2010 | Pandit et al. | |
| 2011/0211518 A1* | 9/2011 | Gupta | H04H 20/63 370/312 |
| 2011/0320576 A1* | 12/2011 | Lauer | H04B 7/18506 709/220 |
| 2013/0031215 A1* | 1/2013 | Macrae | H04L 12/1868 709/219 |
| 2014/0064511 A1* | 3/2014 | Desai | H04R 1/1041 381/74 |
| 2015/0023522 A1 | 1/2015 | Hommel et al. | |
| 2015/0150061 A1* | 5/2015 | Bleacher | H04N 21/422 725/76 |
| 2015/0349875 A1* | 12/2015 | Lauer | H04B 7/18506 370/316 |
| 2015/0350996 A1* | 12/2015 | Lauer | H04W 40/02 370/328 |
| 2016/0352412 A1* | 12/2016 | Di Costanzo | H04L 67/12 |
| 2016/0372117 A1* | 12/2016 | Klose | G10L 15/063 |
| 2017/0063737 A1* | 3/2017 | Torii | G06Q 50/22 |
| 2017/0106997 A1* | 4/2017 | Bekanich | G08B 25/006 |
| 2017/0213552 A1* | 7/2017 | Gupta | G10L 15/22 |
| 2018/0137103 A1* | 5/2018 | Watson | G06F 17/289 |

* cited by examiner

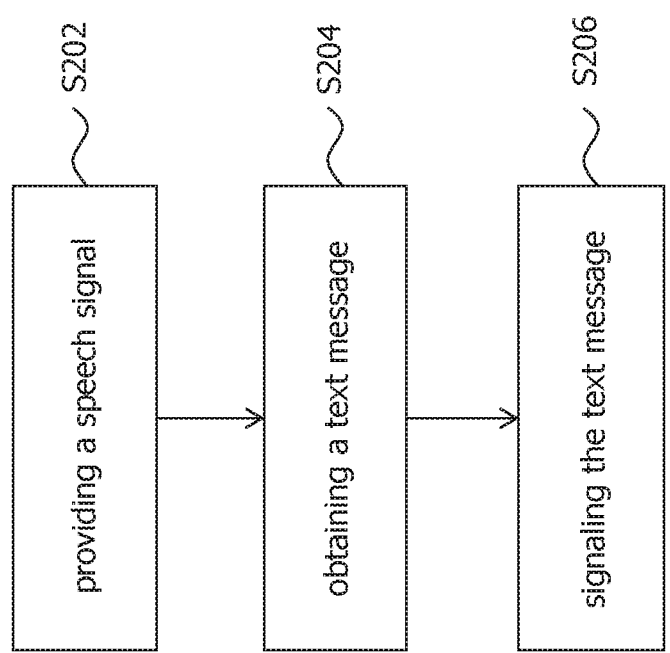

ANNOUNCEMENT SIGNALING ON BOARD AN AIRCRAFT

CROSS-REFERENCES TO RELATED APPLICATIONS

This application claims the benefit of the European patent application No. 15 172 680.9 filed on Jun. 18, 2015, the entire disclosures of which are incorporated herein by way of reference.

BACKGROUND OF THE INVENTION

The present disclosure generally relates to the field of announcement signaling on board an aircraft. More particularly, the present disclosure relates to a method of signaling speech signal related text messages on board an aircraft, to a computer program product for carrying out such a method, an apparatus for signaling speech signal related text messages on board an aircraft, and to an aircraft comprising such an apparatus.

Several announcements are usually made on board of aircraft by aircraft personnel, e.g., flight attendants or pilots. For example, such announcements are made before or after take-off and landing. In general, two different types of announcements exist on board of aircraft, the first being pre-recorded announcements and the second being live announcements. Pre-recorded announcements are sometimes called Pre-Recorded Announcements and Music (PRAM) and live announcements are often called Passenger Address (PA) announcements. Both of these announcements are usually announced or advertised to passengers by a so-called Chime A chime is a certain tone or jingle indicating that an announcement is going to be made. Further, during an announcement, a message is usually displayed on passenger displays of an In-Flight Entertainment (IFE) system. For example, such a message reads "announcement in progress" or the like.

However, for deaf or hearing-impaired passengers it is difficult if not impossible to follow such announcements. Further, passengers might be distracted and might not listen carefully to the announcement made.

Accordingly, there is a need for an improved technique for signaling announcements to passengers on board an aircraft.

SUMMARY OF THE INVENTION

According to a first aspect of the invention, a method of signaling speech signal related text messages on board an aircraft is provided. The method comprises providing a speech signal related to an announcement to passengers of an aircraft. The method further comprises obtaining a text message containing text corresponding to spoken words of the speech signal. The method further comprises signaling the text message to one or more devices on board the aircraft.

In an embodiment, the step of obtaining comprises converting the spoken words of the speech signal into the text contained in the text message. The speech signal may relate to a live announcement made on board the aircraft such as a PA message/announcement. In accordance therewith, Speech-to-Text (STT) techniques may be employed. SST techniques have been developed over the last decades to provide computer-implemented assistance for translating spoken language into text. STT conversion may be considered a process of converting spoken words into written texts. This process is also often called speech recognition. Although these terms are almost synonymous, speech recognition is sometimes used to describe the wider process of extracting meaning from speech, i.e., speech understanding.

In one implementation, speech recognition may be used for generating the text messages that may be displayed to passengers seated in the cabin of the aircraft. In this case, performing speech recognition may include converting the speech signal into a text message to be displayed to at least one passenger in the cabin of the aircraft. The terminology "to convert" may also be understood herein as "to transcribe." For example, speech recognition may be performed on a speech signal that is transmitted as an audio announcement to passengers via loudspeakers installed in the cabin of the aircraft (e.g., using a PA system). A text message thus generated may form a simultaneous textual representation of the audio announcement and may be provided to passengers in addition to the audio announcement itself.

In an embodiment, the step of obtaining comprises retrieving the text message corresponding to the speech signal from a storage component. For example, the speech signal may be pre-recorded and stored in the storage component. Such a pre-recorded speech signal may be converted into a text message in the same way as set forth above. Alternatively, the text message may have been previously derived from the pre-recorded speech signal. In this case, both the pre-recorded speech signal and the text message containing the text that corresponds to the words in the pre-recorded speech signal may be stored in the storage component. The pre-recorded speech signal may be a PRAM message or relate to a PRAM announcement.

The one or more devices may comprise one or more passenger owned devices (PODs). Alternatively, or additionally, the one or more devices may comprise one or more display devices of an In-Flight-Entertainment (IFE) system installed on-board the aircraft.

The text message may be displayed via the in-flight entertainment system on respective display screens, for example. Alternatively, or additionally, the text message may be sent to passenger-owned devices, such as mobile phones, smartphones, or laptops of passengers, which have established connectivity to an onboard connectivity system. This may be particularly helpful for deaf or hearing-impaired passengers who otherwise might not take note of an announcement currently being made. Passenger-owned devices may be required to register for such notification service in advance or may otherwise be determined as a recipient for the text message.

The method may comprise determining the one or more devices to which the text message is to be signaled. Different techniques may be implemented for determining the one or more devices as a recipient for the text message. For example, one or more mobile devices that have registered at an onboard connectivity system, e.g., an onboard base station, of the aircraft may be determined. For example, information provided by a mobile device to an onboard connectivity system may be used to determine that the text message is to be signaled to the respective mobile device. This onboard connectivity system may be or comprise an onboard base station (BS) conforming to various communication standards such as Global System for Mobile Communications (GSM), Universal Mobile Telecommunications System (UMTS), Long Term Evolution (LTE), and/or LTE-advanced (LTE-a). The onboard connectivity system may be or comprise an onboard access point (AP) conforming to various wireless Local Area Network (LAN) standards. Alternatively, or additionally, one or more devices on which a respective application is installed may be determined as a recipient of the text message. The application may be specifically dedicated to the purpose of receiving the text messages onboard aircraft. In order to finally receive text messages, the passenger may register himself/herself with the application. The application may be running on display devices of the IFE. Alternatively, or additionally, the application may have been downloaded by the passenger carrying the device. Alternatively, or additionally, one or more devices on which a subscription procedure has been performed may be determined as a recipient of the text message. The subscription procedure may be performed online, for example, on a respective webpage. The message may then be sent to all registered devices in Multicast.

Alternatively, or additionally, the method may comprise broadcasting the text message to all devices within reach. Alternatively, or additionally, display devices installed in the aircraft may be determined as a recipient of the text message by means of a cabin management system such as the Cabin Intercommunication Data System (CIDS). The cabin management system may address the display devices accordingly. The CIDS is a core digital cabin management system that can control cabin functions and displays status information for passengers and crew. Alternatively, or additionally, the method may comprise transmitting the text message as a beacon message to all devices within reach. The beacon message may be a Wireless LAN (WLAN)/Wi-Fi beacon message or a Bluetooth beacon message. For example, the beacon message may be or comprise a beacon frame. A beacon frame is one of the management frames in IEEE 802.11 based WLANs. It contains all the information about the network. Beacon frames are usually transmitted periodically to announce the presence of a wireless LAN. Beacon frames are typically transmitted by the Access Point (AP) in an infrastructure Basic service set (BSS), i.e., the beacon frame is typically provided by the AP to several stations.

The method comprises, before signaling the text message to the one or more devices, notifying the one or more devices that the text message is to be expected. The notification may include a buzzing sound or the like. In this way, the passengers are informed about the text message and even distracted passengers are more likely to notice the ongoing announcement in audio and/or in text. Various techniques may be used for the signaling. For instance, the signaling may be performed by notifying only the one or more devices that are determined as recipients of the text message and/or notifying all devices within reach by broadcasting, for example. The signaling may be performed via the onboard connectivity system, e.g., an onboard base station, by means of WLAN or Bluetooth beacons, and/or push messages over a data channel via broadcast to all devices within reach or via multicast to all devices that have subscribed to the text message service. The signaling may be performed before or during an announcement.

The step of signaling may comprise transmitting the text message to one or more PODs. Alternatively, or additionally, the step or providing may comprise forwarding the speech signal to one or more loudspeakers installed on-board the aircraft. For example, it may be determined which PODs are to receive the text message. Alternatively, or additionally, it may be determined which loudspeakers are to receive the speech signal. The text message and the speech signal may be transmitted separately, e.g., via different paths. For example, the speech signal may be transmitted via the IFE to a loudspeaker of the IFE under control of the cabin management system and the text message may be signaled to the respective PODs independent from the IFE. The text message may alternatively, or additionally, be signaled to the display devices of the IFE. If it has been determined that the text message is (also) transmitted to display devices of the IFE, the speech signal and the text message may be transmitted on the same route, e.g., together in one common message, via the IFE under control of the cabin management system of the aircraft.

The method may comprise automatically detecting, for each of the one or more devices, a preferred language. The step of signaling may comprise signaling the text message containing text in the detected preferred language. Alternatively, or additionally, the text message may be signaled in several languages. The several languages may include the preferred language. Several techniques may be used to detect the preferred language. For example, the preferred language may be detected, for each of the one or more devices, based on information related to the respective device. The information related to the respective device may comprise information about a subscriber identity module (SIM) card of the respective device. Alternatively, or additionally, the information related to the respective device may comprise information about a telephone number of the respective device. Alternatively, or additionally, the information related to the respective device may comprise information about an operating system running on the respective device. Alternatively, or additionally, the preferred language may be determined based on information related to the application used for registration as mentioned above. Alternatively, or additionally, the preferred language may be derived from the website on which the passenger has subscribed to receive the text messages or from the language used for the subscription. Alternatively, or additionally, the passenger may select his/her preferred language for the text message in an application, a user interface of a webpage or the like.

According to a second aspect, a computer program product is provided. The computer program product comprises program code portions for carrying out one or more of the steps of any of the method aspects described herein, when the computer program product is run or executed on a computer system or on one or more computing devices. The computer program product may be stored on a computer readable recording medium, such as a permanent or rewritable memory, or may be downloadable as a signal.

According to a third aspect, an apparatus for signaling speech signal related text messages on board an aircraft is provided. The apparatus comprises a providing component, an obtaining component and a signaling component. The providing component is configured to provide a speech signal related to an announcement to passengers of an aircraft. The obtaining component is configured to obtain a text message containing text corresponding to spoken words of the speech signal. The signaling component is configured to signal the text message to one or more devices on board an aircraft.

According to a fourth aspect, an aircraft is provided. The aircraft comprises the apparatus as described herein.

All of the aspects described herein may be implemented by hardware circuitry and/or by software. Even if some of the aspects are described herein with respect to the apparatus, these aspects may also be implemented as a method or as a computer program for performing or executing the method. Likewise, aspects described as or with reference to a method may be realized by suitable components in the apparatus, or by means of the computer program.

BRIEF DESCRIPTION OF THE DRAWINGS

In the following, the present disclosure will further be described with reference to exemplary embodiments illustrated in the figures, in which:

FIG. 2 schematically illustrates a flowchart of a method embodiment which may be performed by the apparatus of FIG. 1.

DETAILED DESCRIPTION OF THE PREFERRED EMBODIMENTS

Figure 1:
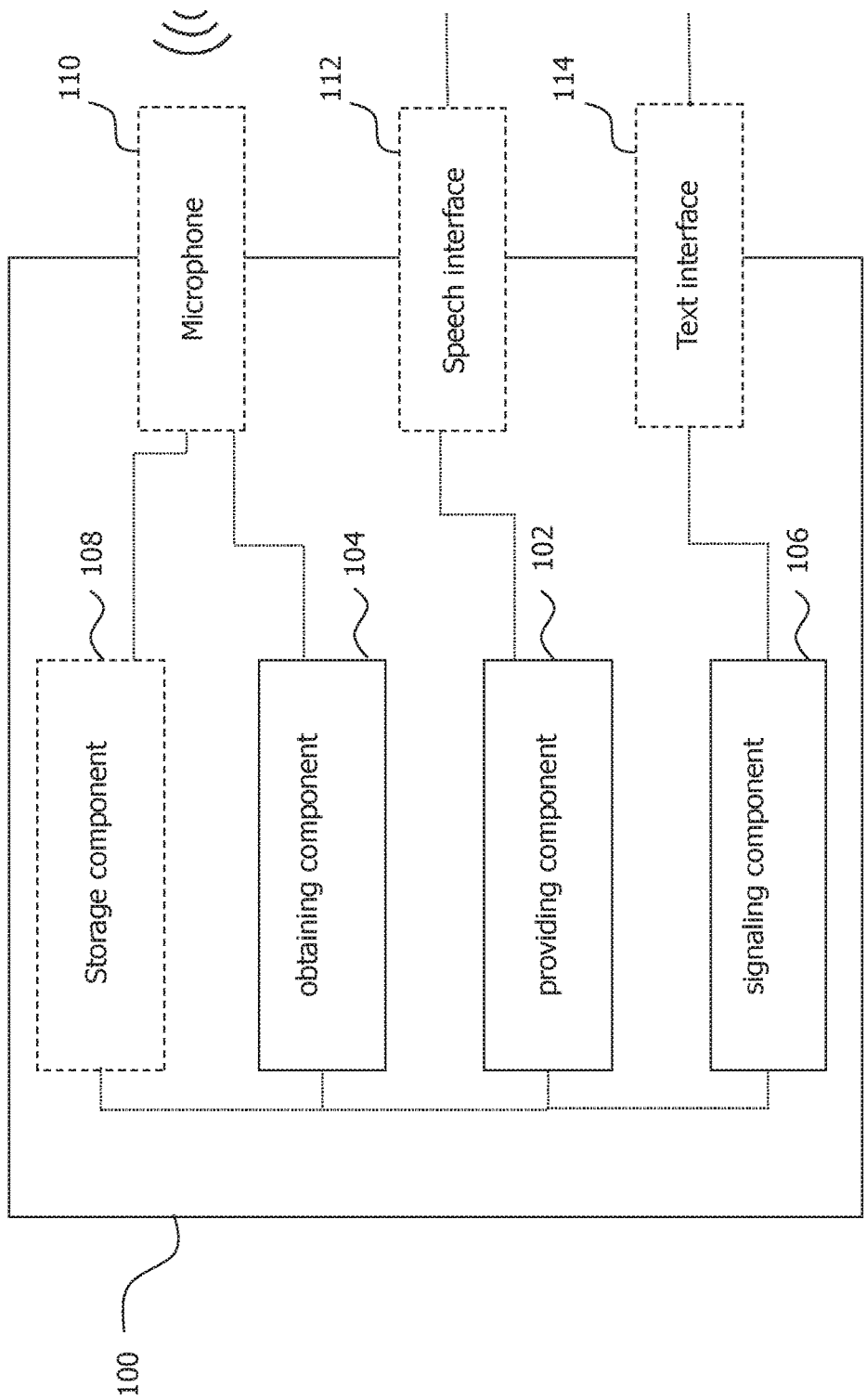
FIG. 1 schematically illustrates an apparatus embodiment.

Before describing invention embodiments in detail, it will be appreciated that the present invention may be embodied in a method, a system or a program product including executable instructions stored in a non-transitory memory or medium. Further, a method of the invention may be carried out by a system of the invention which may include one or more computers executing a program product of the invention. Accordingly, it will be appreciated that in considering a particular method, system or program product embodiment, description of other suitable embodiments may be had. Illustration of a method embodiment, for example, may be useful to also illustrate a program product or system that carries out the method, and vice-versa.

In the following description, for purposes of explanation and not limitation, specific details are set forth in order to provide a thorough understanding of the present disclosure. It will be apparent to one skilled in the art that the present disclosure may be practiced in other implementations that depart from the specific details. For example, the specific message types mentioned below to illustrate the present disclosure are exemplary and other message types may be used in a similar manner.

Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the present disclosure is described as a method, it may also be embodied in a device (e.g., the speech recognition unit described herein below), a computer processor and a memory coupled to a processor, wherein the memory is encoded with one or more programs that perform the methods disclosed herein when executed by the processor.

FIG. 1 schematically illustrates an exemplary embodiment of an apparatus for signaling speech signal related text messages on board an aircraft. The apparatus comprises a providing component 102, an obtaining component 104 and a signaling component 106. Further, the apparatus 100 may comprise one or more of a storage component 108, a microphone 110, a speech interface 112 and a text interface 114. Although the storage component 108 is shown as being part of the apparatus 100 it may equally be arranged outside the apparatus 100. In this case, the apparatus 100 may store in and retrieve data from the storage component 108 arranged outside the apparatus 100. The providing component 102 is configured to provide a speech signal related to an announcement to passengers of an aircraft. The obtaining component 104 is configured to obtain a text message containing text corresponding to spoken words of the speech signal. The signaling component 106 is configured to signal the text message to one or more devices on board the aircraft.

FIG. 2 schematically illustrates a flowchart of a method which may be performed by the apparatus 100. Thus, further details regarding the operation of the apparatus 100 will be described in the following with reference to both FIGS. 1 and 2.

In step S202, a speech signal related to an announcement is provided to passengers of an aircraft by the providing component 102. In step S204, a text message containing text corresponding to spoken words of the speech signal is obtained by the obtaining component 104. In step S206, the text message is signaled to one or more devices on board the aircraft by the signaling component 106.

It is to be noted that the order of the above steps does not in any way limit the method to this specific order. Rather, it is very well conceivable that, first, a text message is obtained, and then a speech signal is provided. Likewise, it is conceivable that the steps of forwarding and obtaining are carried out at substantially the same time.

Further optional details regarding the apparatus 100 of FIG. 1 and the method of FIG. 2 are explained in the following.

The apparatus 100 may be integrated into or combined with—e.g., as a software or hardware component—one or more existing systems provided in an aircraft and supplement these systems by providing the functionalities described herein that may be used to execute desired functions of these systems and/or extend the functionalities of these systems by adding additional functions. For example, the apparatus 100 may be integrated into or connected with a cabin management system of the aircraft and may be used to interact with the cabin management system. It will be understood that other implementations of the apparatus 100 are conceivable. For example, the apparatus 100 may be provided as a standalone unit that may communicate, e.g., via a network, with other systems or entities provided in the aircraft and trigger execution of functions provided by these systems.

A spoken text input into the microphone 110 by aircraft personnel, e.g., a pilot or a flight attendant, may be forwarded, as a speech signal, from the microphone 110 to the obtaining component 104 or to the storage component 108.

The spoken text may relate to a pre-recorded message/announcement or to a live message/announcement.

The live message/announcement may be a PA message/announcement. In case of a PA message/announcement, the microphone 110 may forward the respective speech signal directly to the obtaining component 104 rather than to the storage component 108. The obtaining component 104 then converts the spoken words of the speech signal into text. The text message containing the text resulting from the conversion performed in the obtaining component 104 may then be signaled, if desired, to one or more devices on board the aircraft as will be explained in more detail below. In order to perform the conversion various Speech-to-Text (STT) techniques may be employed.

The pre-recorded message may have been pre-recorded in that a person speaks into a microphone such as microphone 110 or any other microphone connected to the storage component 108 and the pre-recorded message is then stored in the storage component 108. For example, the speech signal may be pre-recorded and stored in the storage device as a corresponding pre-recorded message/announcement. The speech signal may be converted in the same way as set forth above. The speech signal may be stored together with a text message containing the text that corresponds to the spoken words in the speech signal. The pre-recorded message may be or relate to a PRAM message/announcement. The microphone 110 may forward the PRAM message directly to the storage component 108 to store the PRAM message. Additionally, to the PRAM message itself, a text message related to the PRAM message may be input into and stored in the storage component 108. The text message may contain a written version of the spoken text contained in the PRAM message. The text message may be stored in a variety of different languages. The text message may be created in various ways. For example, the text message may be created in advance outside the apparatus 100. In this case, the text message may be directly input into the storage component 108. It is also conceivable that the text message is created from the PRAM message inside the apparatus 100. In this case, the microphone may forward the PRAM message to the obtaining component 104 that may generate the text message from the PRAM message and may then store the PRAM message and the text message in the storage component 108. STT techniques may be performed on the PRAM message in the obtaining component 104 and the resulting text message may be stored in the storage component 108 in one or more different languages. The obtaining component 104 may, if desired, obtain, e.g., retrieve, the PRAM message as well as the text message in any desired language(s) from the storage component 108.

The speech signal may be transmitted by the providing component 102 via the speech interface 112 into the aircraft cabin, more specifically to passengers via loudspeakers installed in the aircraft cabin (e.g., via the so-called Passenger Address, PA, system or as a PRAM message), as an audio announcement. As explained above, in case of a pre-recorded speech signal, the providing component 102 may retrieve the speech signal from the storage component 108 and may forward the speech signal to the one or more devices that are to receive the speech signal and that are to output the speech signal to the passengers. In case of a live speech signal, the providing component 102 may receive the speech signal from the obtaining component 104 and may forward the speech signal to the one or more devices that are to receive the speech signal and that are to output the speech signal to the passengers.

Independent of the exact implementation of the conversion of the speech signal and the storing of the message(s), the speech signal and the corresponding text message can be forwarded to one or more devices on board the aircraft. The one or more devices may comprise one or more passenger owned devices (PODs). Alternatively, or additionally, the one or more devices may comprise one or more devices of an In-Flight-Entertainment (IFE) system installed on-board the aircraft such as loudspeakers and/or display devices of the IFE.

The text message may be signaled to PODs and/or display devices of the IFE and the speech signal may be signaled to loudspeakers of the IFE and eventually display devices of the IFE. The text message may be sent to PODs, such as mobile phones, smartphones, or laptops of passengers, which have established connectivity to an onboard connectivity system or have otherwise been determined as a recipient of the text message. Alternatively, or additionally, the text message may be displayed via the in-flight entertainment system on respective display screens, for example. Both may be particularly helpful for deaf or hearing-impaired passengers who otherwise might not take note of an announcement currently being made. It is conceivable that, first, it is determined by the signaling component 106 which passengers are to receive the text message via their POD(s) and which passengers are to receive the text message via the IFE. PODs may be required to register for such notification service in advance or may otherwise be determined.

If the text message is to be sent to PODs, the PODs to which the text message is to be signaled may be determined in various ways by the signaling component 106. For example, one or more mobile devices that have registered at an onboard base station of the aircraft may be determined by the signaling component 106. For example, information provided a mobile device to onboard connectivity system to establish a connection with the onboard connectivity system may be used to determine that the text message is to be signaled to the respective mobile device. The onboard connectivity system may be or comprise an onboard base station (BS) conforming to different standards such as GSM, UMTS, LTE, and/or LTE-a. The onboard connectivity system may be an onboard access point (AP) conforming to wireless LAN standards. Alternatively, or additionally, a passenger wishing to receive the text messages may download a respective application. The application may be specifically dedicated to the purpose of receiving the text messages onboard aircraft. Before receiving the text messaging service, the passenger may register himself/herself with the application or may subscribe to the text messaging service.

Independent on the exact implementation of determining the PODs, the text message may be signaled by the signaling component 106 to one or more PODs and/or one or more display devices of the IFE system. The generated text messages may then be displayed to passengers seated in the cabin of the aircraft. A message thus generated may be provided to passengers as a simultaneous textual representation of the audio announcement which may be output via the in-flight entertainment system on respective loudspeakers eventually together with a video on the respective display screens of the IFE, for example. For this purpose, the providing component 102 may provide the speech signal to one or more devices provided on-board the aircraft that have audio reproduction capability. For example, the speech signal may be transmitted by the providing component 102 to one or more loudspeakers of the IFE system that are provided at distinct locations of the aircraft. Further, the signaling component 106 may signal the corresponding text message to one or more devices on-board the aircraft that have display capability. One or more of the devices to which the text message is signaled may be part of the IFE system. Alternatively, or additionally, one or more of the devices to which the text message is signaled may be PODs.

More specifically, if it is determined that the text message is to be received via a POD, the speech signal and the text message may be transmitted separately, e.g., via different paths. For example, the speech signal may be transmitted from the providing component 102 via the speech interface and via the IFE to a loudspeaker of the IFE and the text message may be signaled by the signaling component 106 via the text interface 114 to the respective POD independent of the IFE. The text message may additionally also be signaled by the signaling component 106 via the text interface 114 to the display devices of the IFE. If it has been determined that the text message is not to be received via a POD, the speech signal and the text message may be transmitted on the same route, e.g., together in one common message, via the IFE under control of the cabin management system of the aircraft. However, as exemplarily shown in FIG. 2, the speech signal and the text message may be transmitted on different routes, i.e., the speech signal by the providing component 102 via the speech interface 112 and via the IFE under control of the cabin management system of the aircraft and the text message by the signaling component 106 via the text interface 114 and via the IFE under control of the cabin management system of the aircraft.

Before or during signaling of a text message to the one or more devices, the one or more devices that are to receive the text message may be notified. The notification may include a buzzing sound or the like. The notification may be transmitted by the signaling component 106 via the text interface 114. For example, PODs may be notified while display devices of the IFE system may not be notified.

Further, for each of the one or more devices, a preferred language may be determined. In this case, the text message containing text in the detected preferred language may be signaled to the respective device(s). Several techniques may be used to detect the preferred language. In case of a mobile phone or similar devices implementing mobile communication techniques, the preferred language may be determined from the language or country settings of the respective SIM card or from the country code of the telephone number of the respective device. Regarding general PODs, the preferred language may be determined from an operating system running on the respective device. In case of a registration or subscription to the text messaging service, the preferred language may be determined from the language settings of the application or website used for registration or subscription.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of signaling speech signal related text messages on board an aircraft, wherein the method comprises:
   providing a speech signal related to an announcement to passengers of the aircraft;
   obtaining a text message containing text corresponding to spoken words of the speech signal by applying speech recognition to the speech signal;
   determining one or more mobile devices to which the text message is to be signaled as recipients of the text message; and
   signaling the text message to the one or more mobile devices determined as the recipients of the text message on board the aircraft by transmitting the text message in multicast,
   wherein the step of determining the one or more mobile devices comprises
      determining one or more of the mobile devices on which a respective application is installed;
   wherein the method is carried out by an apparatus on board the aircraft; and
   wherein said providing a speech signal comprises generating the speech signal in real time on board the aircraft;
   wherein the one or more mobile devices determined as the recipients of the text message are brought on board the aircraft by the passengers of the aircraft,
   wherein the method comprises detecting a preferred language for each of the one or more mobile devices determined as recipients of the text message based on information related to the respective mobile device and the step of signaling comprises transmitting the text message containing text in the detected preferred language;
   wherein said information related to the respective mobile device that is used to detect the preferred language comprises at least one of:
      information about a Subscriber Identity Module, SIM, card of the respective mobile device;
      information about a telephone number of the respective mobile device; or
      information about an operating system running on the respective mobile device.

2. The method of claim 1, wherein the step of obtaining comprises converting the spoken words of the speech signal into the text contained in the text message.

3. The method of claim 1, wherein the step of obtaining comprises retrieving the text message corresponding to the speech signal from a storage component.

4. The method of claim 1, wherein the method comprises, before signaling the text message to the one or more mobile devices determined as the recipients of the text message, notifying the one or more mobile devices determined as the recipients of the text message that the text message is to be expected.

5. The method of claim 1, wherein the step of providing comprises forwarding the speech signal to one or more loudspeakers installed on-board the aircraft.

6. The method of claim 1, wherein the step of signaling comprises wirelessly transmitting the text message to the one or more mobile devices determined as the recipients of the text message.

7. The method of claim 1, wherein said respective application is dedicated to receiving the text messages onboard the aircraft.

8. A non-transitory computer-readable medium storing instructions executable by a computer processor for signaling speech signal related text messages on board an aircraft, comprising instructions to:
   provide a speech signal related to an announcement to passengers of the aircraft;
   obtain a text message containing text corresponding to spoken words of the speech signal by applying speech recognition to the speech signal;
   determine one or more mobile devices to which the text message is to be signaled as recipients of the text message; and
   signal the text message to the one or more mobile devices determined as the recipients of the text message on board the aircraft by transmitting the text message in multicast, wherein the instructions to determine the one or more mobile devices comprise determining one or more of the mobile devices on which a respective application is installed; and wherein said providing a speech signal comprises generating the speech signal in real time on board the aircraft;

wherein the one or more mobile devices determined as the recipients of the text message are brought on board the aircraft by the passengers of the aircraft;

wherein the non-transitory medium further comprises instructions to:

detect a preferred language for each of the one or more mobile devices determined as recipients of the text message based on information related to the respective mobile device and the step of signaling comprises transmitting the text message containing text in the detected preferred language;

wherein said information related to the respective mobile device that is used to detect the preferred language comprises at least one of:

information about a Subscriber Identity Module, SIM, card of the respective mobile device;

information about a telephone number of the respective mobile device; or information about an operating system running on the respective mobile device.

9. The non-transitory computer-readable medium of claim 8, wherein said respective application is dedicated to receiving the text messages onboard the aircraft.

10. An apparatus for signaling speech signal related text messages on board an aircraft, wherein the apparatus comprises:

a first component configured to provide a speech signal related to an announcement to passengers of an aircraft;

a second component configured to obtain a text message containing text corresponding to spoken words of the speech signal by applying speech recognition to the speech signal; and a third component configured to:

determine one or more mobile devices to which the text message is to be signaled as recipients of the text message, detect a preferred language for each of the one or more mobile devices determined as recipients of the text message based on information related to the respective mobile device, and signal the text message to the one or more mobile devices determined as the recipients of the text message on board the aircraft by transmitting the text message in multicast, wherein the one or more mobile devices determined as the recipients of the text message are brought on board the aircraft by the passengers of the aircraft, wherein for the determining of the one or more mobile devices, the third component is further configured to determine one or more of the mobile devices on which a respective application is installed;

wherein said providing a speech signal comprises generating the speech signal in real time on board the aircraft;

wherein said signaling comprises transmitting the text message containing text in the detected preferred language; and wherein said information related to the respective mobile device that is used to detect the preferred language comprises at least one of:

information about a Subscriber Identity Module, SIM, card of the respective mobile device;

information about a telephone number of the respective mobile device; or information about an operating system running on the respective mobile device.

11. An aircraft comprising the apparatus of claim 10.

12. The apparatus of claim 10, wherein said respective application is dedicated to receiving the text messages onboard the aircraft.

* * * * *